W. W. SLOANE.
STORAGE BATTERY LOCOMOTIVE.
APPLICATION FILED MAY 28, 1917.

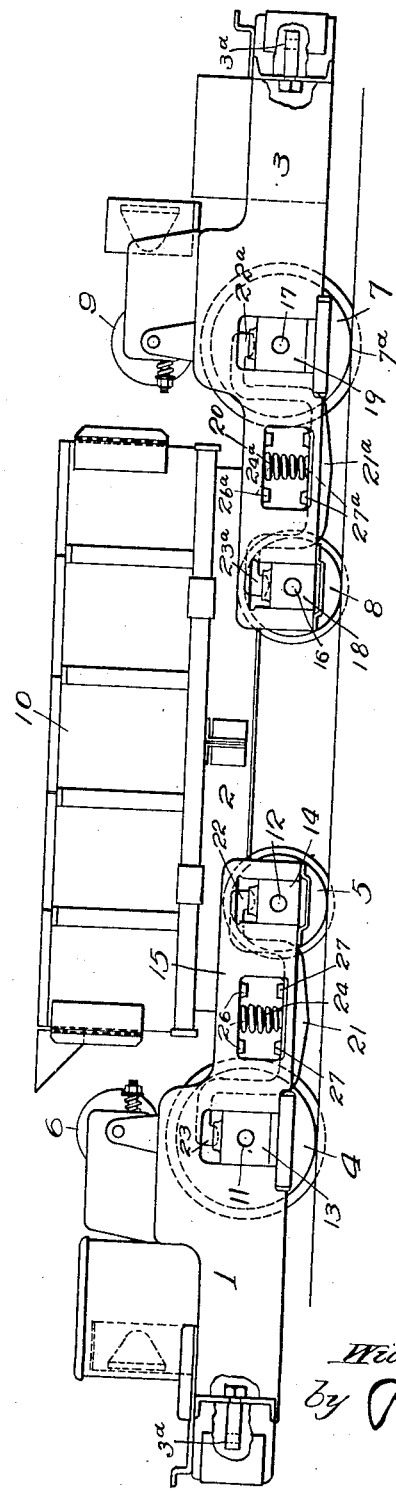

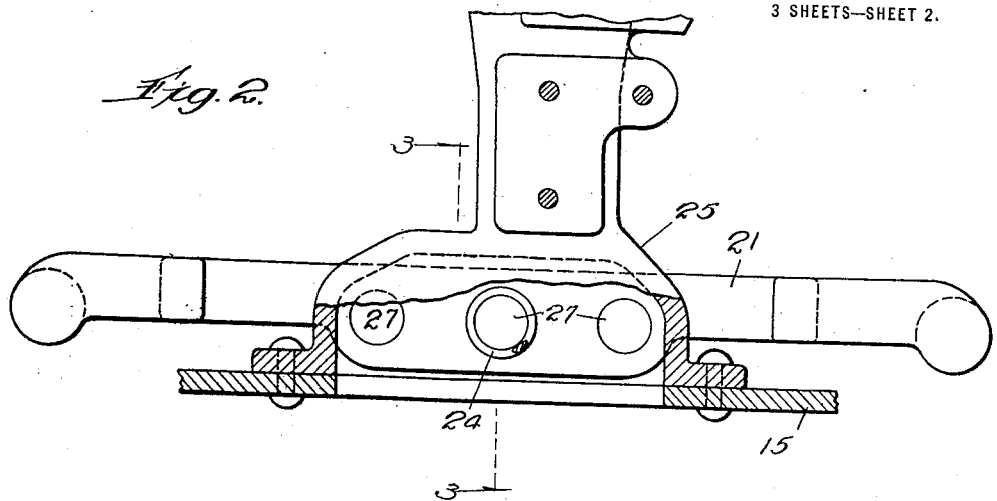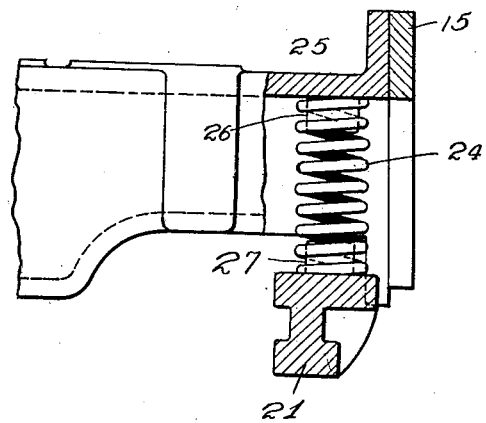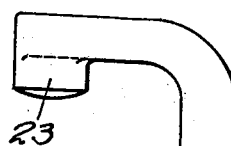

1,331,591. Patented Feb. 24, 1920.
3 SHEETS—SHEET 3.

Inventor:
William W. Sloane,
by Parker & Carter
his Attys.

Witness:

UNITED STATES PATENT OFFICE.

WILLIAM W. SLOANE, OF CHICAGO, ILLINOIS, ASSIGNOR TO GOODMAN MANUFACTURING COMPANY, OF CHICAGO, ILLINOIS, A CORPORATION OF ILLINOIS.

STORAGE-BATTERY LOCOMOTIVE.

1,331,591. Specification of Letters Patent. Patented Feb. 24, 1920.

Application filed May 28, 1917. Serial No. 171,348.

*To all whom it may concern:*

Be it known that I, WILLIAM W. SLOANE, a citizen of the United States, residing at Chicago, in the county of Cook and State of Illinois, have invented a certain new and useful Improvement in Storage-Battery Locomotives, of which the following is a specification.

This invention relates to storage battery locomotives particularly adapted for use in mines and has among other objects to provide a locomotive of this description which readily adapts itself to uneven track surfaces.

The invention is illustrated in the accompanying drawings, wherein—

Figure 1 is a side elevation of one form of locomotive embodying the invention;

Fig. 2 is a detailed view in part section of the connecting piece between the wheel axles and the frame of the machine;

Fig. 3 is a sectional view taken on the line 3—3 of Fig. 2;

Fig. 4 is an enlarged side view of the connection between the wheel axles and the frame of the machine.

Like parts refer to like numerals throughout the several figures.

Figure 5:
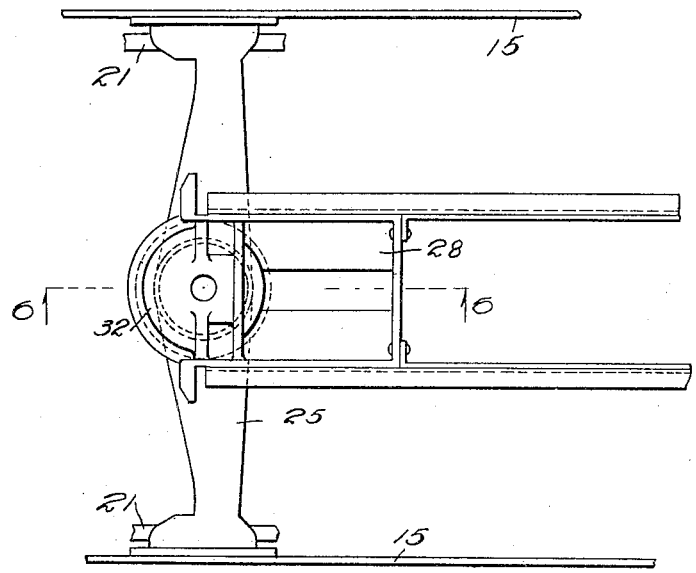
Fig. 5 is a plan view with parts omitted, showing the pivot connecting the sections together.

In the construction illustrated the locomotive is made up of three sections 1, 2 and 3. The end section 1 is provided with driving wheels 4 and undriven wheels 5, the driving wheels being driven by the motor 6. The end section 3 is provided with driving wheels 7 and undriven wheels 8, the driving wheels being driven by the motor 9.

Figure 6:
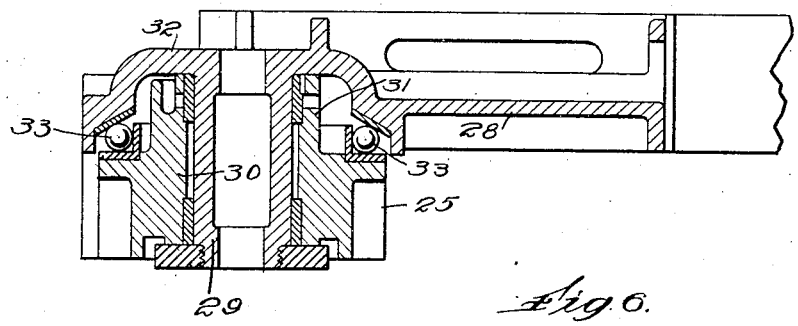
Fig. 6 is a vertical sectional view through said pivot taken as indicated on line 6—6 of Fig. 5.

In the construction shown, the driving wheels are larger than the undriven wheels and the undriven wheels of both end sections project under the central section 2. This central section 2 carries the storage battery 10 from which the current is derived to operate the motors 6 and 9. The draw bars 3ª it will be noted are directly connected to the end sections 1 and 3 and not to the section 2. The three sections, 1, 2 and 3 are pivotally connected together by means of substantially vertical pivots so that they move relatively in a substantially horizontal plane to facilitate their passing around a curve, but they are substantially rigidly connected so far as relative vertical movement among them in a vertical plane is concerned so that the strains when one of the draw bars 3ª is connected to the load to be pulled are transmitted from either end section through the central section to the other end section. This vertical rigidity, however, tends to cause some of the wheels to be lifted from the track where the track is undulating, that is, where there are hills along the track. In the present case I provide means for obviating this difficulty. It will be noted that the axles 11 and 12 are connected with the parts 13 and 14, said parts being movably connected with the frame 15 of the part 1 thereby having a slidable connection. The axles 16 and 17 of section 3 are connected to the parts 18 and 19 which are movably connected with the frame 20 of section 3. A connecting piece 21 (see Figs. 1, 2 and 4) is provided with the engaging pieces 22 and 23 which engage or rest upon the parts 13 and 14 or some part connected with the axles 11 and 12. An elastic connecting device such as the spring 24 is interposed between the connecting piece 21 and the frame 15 of section 1 or some part connected therewith. In the construction illustrated there is a cross piece 25 (see Fig. 2) which extends from one side of section 1 to the other side thereof to hold the side pieces together and the spring 24 engages this cross piece and the connecting piece 21, (see Fig. 3). The cross piece is provided with the projections 26 which fit in the hollow end of the spring to hold it against lateral movement and the connecting piece is provided with similar projections 27 which project into the hollow at the other end of the spring. By having a plurality of these projecting pieces the spring may be located at different points between the axles so as to regulate or vary the weight or pressure on the driving wheels. It will thus be seen that the weight on the wheels 4 and 5 is transmitted through the spring 24 and connecting piece 21 and that this connecting piece permits the wheels to move so as to adjust themselves to the undulations of the track, the wheels being thereby kept upon the track. A similar connecting piece 21ª, which has the engaging pieces 22ª and 23ª and which is connected by the spring 24ª with a cross piece similar to the cross piece 25 extends across section 3 and is provided with the projections 26ª, the connecting piece 21ª having the projections 27ª. The pivotal connection between the two end sections and the central section is the same in each case, and in Figs. 5 and 6 I have illustrated one form of this pivotal connection. In this construction the frame piece 28 is provided with a projecting pivot 29, preferably integral therewith. This pivot is also preferably hollow. The pivot 29 projects into a receiving part 30 fastened to the end section, in this case being fastened to, or a part of, the cross piece 25. This part into which the pivot is received is preferably provided with an upstanding part 31 and the frame 28 is preferably provided with a protecting or covering piece 32 which extends laterally so as to protect the pivotal connection. The upstanding part 31 projects up into the protecting or covering piece. I prefer to provide a friction reducing connection which permits relative movement between the sections horizontally as by means of the ball bearings 33. It will be seen that this pivot, which is substantially vertical, engages the part into which it is received so as to prevent vertical angular relative movement between the sections. When I use this form of expression of vertical angular relative movement between the sections, I use it as meaning organized relative vertical angular movement and not to exclude any small amount of relative movement due to the wearing of the parts of the clearances required for assembling the parts and for the operation thereof. The other side of the locomotive is provided with connecting pieces similar to 21 and 21ª and associated parts.

It will thus be seen that by means of this construction the vertical rigidity required to properly transmit the stresses from one end section through the central section to the other end section is maintained and at the same time the wheels automatically adjust themselves to undulations and irregularities in the track so as to be maintained upon the track at all times.

I have described in detail a particular construction embodying the invention, but it is of course evident that the parts may be varied in many particulars without departing from the invention herein shown and described and specifically pointed out in the claims hereof.

The use and operation of my invention are as follows:

When the locomotive is being used to pull a train of cars the draw bar 3ª is connected with the car or cars to be drawn. Now it will be noted that as the locomotive moves along the track there is a pull on this draw bar, and since the draw bar is connected directly to the end section containing the wheels, the point where this pull is applied to the locomotive, is necessarily above the top of the rail upon which the wheels rest, and it will be seen that this pull tends to revolve the whole locomotive around the point of contact between the rearmost wheel and the track and if said rearmost wheel is the wheel 7, this point would be the point 7ª. Now if the section 3 is connected to the central section 2 by a connection which permits vertical movement in this line of pull, it will be seen that the pressure of the undriven wheels, as for example, the wheels 8 upon the track, will be reduced and might be entirely raised from the track. By means of the rigid connection between the sections 1, 2 and 3 which prevents vertical relative movement between the several sections along this line of pull, it will be seen that in order to lift the undriven wheels from the track or reduce their pressure on the track, it will be necessary to lift the entire locomotive beyond the point 7ª, that is, revolve the entire locomotive about the point 7ª. Since, however, the vertical lever arm, by means of which the pull on the draw bar 3ª acts to produce this movement, is shorter than the horizontal lever arm from the point 7ª to the center of gravity of the remaining portion of the locomotive, it will be seen that this rigidity against vertical relative movement between the sections will thus completely prevent the undriven wheels from being lifted from the track or have their pressure upon the track reduced in any sufficient amount to interfere with the operation of the locomotive.

It will further be noted, however, that this rigidity against vertical relative movement between the sections along this line of pull brings in another factor which must be taken care of, and that is, that if there are vertical irregularities in the track, this rigidity tends to prevent the wheels from freely following these vertical irregularities, and hence some of the wheels are liable at some times to be off track and cause derailment of the locomotive, and if these wheels happen to be the driving wheels, to interfere with the development of the maximum draw bar pull. In the present device this difficulty is obviated by means of the connecting pieces 21 and 21ª extending between the two wheels at each side of the end sections, for since each connecting piece is connected at its ends with the supports of the wheels between which it extends and there is an elastic connection between each connecting piece, and the end section with which it is associated, it will be seen that the wheels are free to move relatively with relation to the section to which they are connected so that they can freely follow the vertical irregularities in the track without their being in interference whatever with the vertical rigidity against relative vertical movement between the several sections along the line of pull.

I claim:—

1. A mining locomotive comprising a central section, two end sections pivotally connected to said central section, means for maintaining an angular rigidity between said sections in all vertical planes, each end section provided with four wheels two at each side thereof, a draw bar connected with one of said wheeled sections for connecting the locomotive with its load, wheel supports with which said wheels are connected, connecting pieces extending between the two wheels at each side of the end sections, each connecting piece connected at its ends with the supports of the wheels between which it extends and an elastic connection between each of said connecting pieces and the end section with which it is associated.

2. A mining locomotive comprising a central section, two end sections pivotally connected to said central section, each end section provided with four wheels two at each side thereof, wheel supports with which said wheels are connected, connecting pieces extending between the two wheels at each side of the end sections, each connecting piece connected at its ends with the supports of the wheels between which it extends and an elastic connection between each of said connecting pieces and the end section with which it is associated, and means for varying the position of said elastic connection so as to vary relatively the weight on the two wheels with which it is associated.

3. A mining locomotive comprising two sections pivotally connected together, two pairs of wheels on one of said sections, one pair at each side thereof, a draw bar connected with one of said wheeled sections for connecting the locomotive with its load, supports for said wheels movably connected with the section with which the wheels are associated, connecting pieces connecting the supports of the two wheels at each side of said section and a spring connecting each connecting piece with said section.

4. A mining locomotive comprising two sections pivotally connected together, two pairs of wheels on one of said sections, one at each side thereof, supports for said wheels movably connected with the section with which the wheels are associated, connecting pieces connecting the supports of the two wheels at each side of said section and a spring connecting each connecting piece with said section and means for varying relatively the weight on said wheels.

5. A mining locomotive comprising two sections pivotally connected together, a pair of wheels at each side of one of said sections, a draw bar connected with said wheeled sections for connecting the locomotive with its load, supports for said wheels movably connected with said section, a connecting piece extending between each pair of wheels and connected with the supports thereof, the middle portion of said connecting piece being depressed and a spring connecting the depressed portion of each connecting piece with the section whereby the weight is transmitted to the wheels through said springs and connecting pieces.

6. A mining locomotive comprising a central section and two end sections pivotally connected together so that each end section has an angular motion around a vertical axis with relation to the central section for limiting relative angular motion around a horizontal axis between each section and the central section, four wheels connected with each end section, two wheels at each side thereof, a draw bar connected with one of said wheeled sections for connecting the locomotive with its load, supports for said wheels, a connection extending between the two wheels at each side and connected with the wheel supports and an elastic connection between each of said connecting pieces and the section with which it is associated whereby the wheels automatically adjust themselves to irregularities in the track.

7. A mining locomotive comprising a central section and two end sections, a substantially vertical pivot connecting each end section with the central section, receiving parts into which said pivots are received and in which they move to permit horizontal relative angular movement between the sections, said pivots engaging the receiving parts into which they are received so as to prevent relative angular vertical movement between said sections, each end section being provided with four wheels, two at each side thereof, a draw bar connected with one of said wheeled sections for connecting the locomotive with its load, wheel supports with which said wheels are connected, connecting pieces extending between the two wheels at each side of each end section, each connecting piece connected at its end with the supports of the wheels between which it extends and an elastic connection between each of said connecting pieces and the end section with which it is associated.

8. A mining locomotive comprising two sections, a substantially vertical pivot connecting the two sections, a receiving part into which said pivot is received, and in which it moves to permit horizontal relative angular movement between the sections, said pivot engaging the receiving part into which it is received so as to prevent relative angular vertical movement between said sections, two pairs of wheels on each of said sections, one pair at each side thereof, a draw bar connected with one of said wheeled sections for connecting the locomotive with its load, supports for said wheels movably connected with the said sections, a connecting piece at each side of said section connecting the supports of the two wheels at each side thereof and a spring connecting each connecting piece with said section.

In testimony whereof I affix my signature, in the presence of two witnesses, this 7th day of May, 1917.

WILLIAM W. SLOANE.

Witnesses:
 MARION INGRAHAM,
 LYDIA M. SYLVANUS.